Dec. 16, 1969 KENICHI YAMAMOTO ET AL 3,483,850

ROTARY PISTON INTERNAL COMBUSTION ENGINE

Original Filed Oct. 19, 1967 3 Sheets-Sheet 1

INVENTORS
KENICHI YAMAMOTO
HIDEYA SATOH

BY Wenderoth, Lind & Ponack
ATTORNEYS

Dec. 16, 1969 KENICHI YAMAMOTO ET AL 3,483,850

ROTARY PISTON INTERNAL COMBUSTION ENGINE

Original Filed Oct. 19, 1967 3 Sheets-Sheet 2

INVENTORS
KENICHI YAMAMOTO
HIDEYA SATOH

BY Wenderoth, Lind & Ponack
ATTORNEYS

ROTARY PISTON INTERNAL COMBUSTION ENGINE

Original Filed Oct. 19, 1967 3 Sheets-Sheet 3

INVENTORS
KENICHI YAMAMOTO
HIDEYA SATOH

BY Wenderoth, Lind & Ponack
ATTORNEYS

United States Patent Office 3,483,850
Patented Dec. 16, 1969

3,483,850

ROTARY PISTON INTERNAL COMBUSTION ENGINE

Kenichi Yamamoto and Hideya Satoh, Hiroshima-shi, Japan, assignors to Toyo Kogyo Company Limited, Aza-Shinchi, Fuchu-cho, Aki-gun, Hiroshima-ken, Japan Continuation of application Ser. No. 676,498, Oct. 19, 1967. This application Mar. 6, 1969, Ser. No. 805,050
Claims priority, application Japan, Oct. 19, 1966, 41/69,157
Int. Cl. F02b *53/00;* F01c *3/00*
U.S. Cl. 123—8 7 Claims

ABSTRACT OF THE DISCLOSURE

A rotary piston internal combustion engine having at least one exhaust port opening through the housing in which a rotary piston eccentrically rotates, and the inner surface of the said housing is provided with at least one recess for permitting gentle expelling of the combustion products therethrough to the exhaust port before the substantial exhausting through the exhaust port takes place.

This application is a continuation of application Ser. No. 676,498, filed Oct. 19, 1967, now abandoned.

The average rotary piston internal combustion engines comprise a pair or axially spaced flat end walls and an annular center casing having at least two-lobed internal surface and interconnecting the said end walls. At least three sided rotary piston eccentrically rotatably disposed within the cavity formed by the said end walls and the center casing thereby forming a plurality of working chambers and by the planetary motion of the rotary piston in the cavity, each of the working chambers varies its volume and thereby the intake, compression, explosion, expansion and exhaust strokes are performed. For the purpose of efficient action of those strokes, the piston has on each apex thereof an apex seal which sealingly engages with the inner surface of the center casing and, the opposite end faces of the rotary piston having side seal stripes extending between each pair of the apexes for sealing engagement with adjacent end wall inner face. Each end of the said side seal stripes and axial end of the apex seals are combined by a corner seal member for the sealing insurance purpose thereabout. End faces of the piston also have oil seal rings radially inwardly spaced from the side seal stripes for the purpose of blocking lubrication and/or cooling oil leakage past therethrough. With the planetary motion of the rotary piston, hereinbefore enumerated seal members each runs along the regular path drawn on the adjacent member by the displacing of each seal member.

In view of the positioning of the above described regular path of the sealing member motion, the positioning and the feature of the combustion products exhaust port opening is restricted by the said paths and, the exhaust port initial opening edge and the exhaust port closing terminal edge subject to open and close timing of the exhaust port which highly affects the performance, especially the out-put characteristic, of the engine. For the purpose of instant expelling of the combustion product through the above described restricted exhaust port opening dimension, the feature of the exhaust port must be such that permits the opening as larger as possible when the exhaust is started.

Satisfaction of the immediate above described opening characteristic of the exhaust in which the expelling of the combustion products is instantly performed, however, on the other hand, the exhaust opening to the full quency explosive noise of the exhaust is unavoidable.

An object of the present invention is to provide a rotary piston internal combustion engine in which the combustion products exhausting is initially started with the gentle exhaust development so that thereby the high-frequency exhausing explosive noise is eliminated.

Another object of the present invention is to provide the combustion products exhaust means for the rotary piston internal combustion engine in which the exhaust port is provided with at least one small recess at the initial opening edge of the exhaust port so as to permit the high exhaust pressure is partially expelled through the said recess to the exhaust port before the substantial exhaust takes place, whereby the exhaust pressure is subdued for eliminating the abrupt change of the pressure in the exhaust port which produces the high-frequency noise due to the exhaust of the combustion products.

Another and further objects and advantages of the present invention will become apparent from the following detailed description and accompanying drawing in which.

Figure 1:
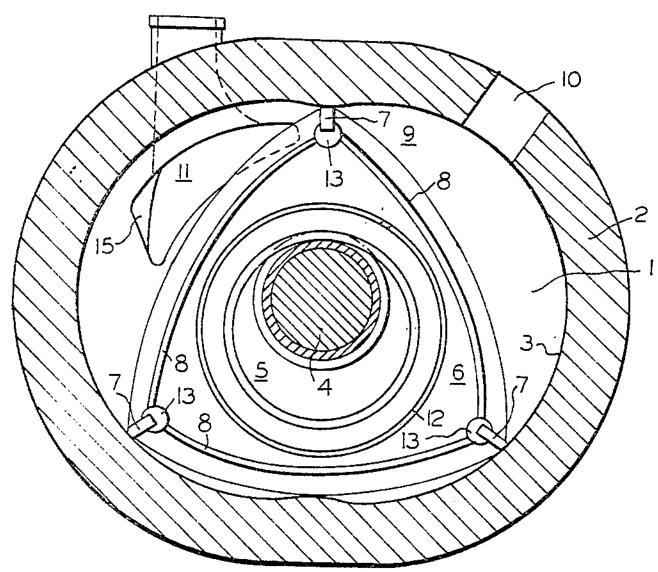
FIG. 1 is a side elevation of the rotary piston engine mechanism with one end wall of the engine housing removed to show the rotary piston positions therein and an exhaust port opening according to the present invention.
Figure 2:
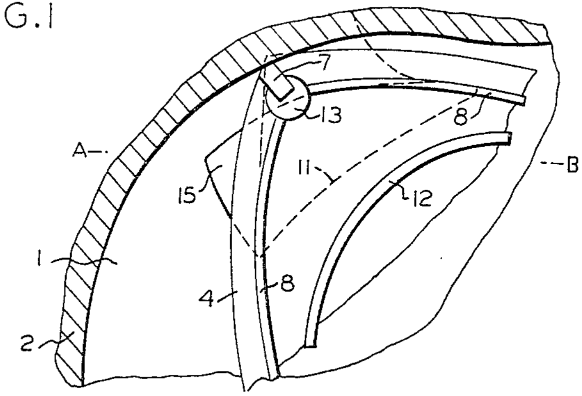
FIG. 2 is an enlarged fragmentary view showing the exhausing opening of the invention with the rotary piston somewhat displaced from the position shown in FIG. 1.
Figure 3:
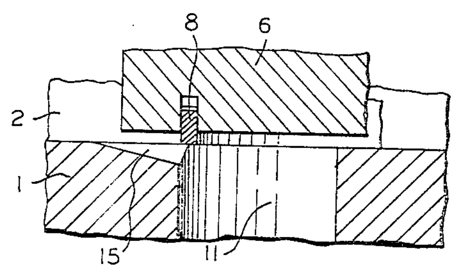
FIG. 3 is a cross sectional view taken along the line A—B in FIG. 2.

As shown in figures especially in FIGURE 1, rotary piston internal combustion engine comprises a housing composed of axially spaced end walls 1 having substantially flat inner face, and an annular center wall 2 disposed between and interconnecting said end walls to form a cavity therebetween. The inner surface 3 of the annular center wall 2 preferably has a multi-lobed cross-sectional profile which is basically an epitrochoid. A shaft 4 extends coaxially of the cavity defined by the housing and is journaled in bearings in the walls 1. Eccentrically disposed in the housing and journaled on an eccentric portion 5 of the shaft 4 is a rotary piston 6 having a plurality of circumferentially-spaced apex portions around its outer periphery. Each of said apex portions has radially movable apex seal means 7 which are in continuous sealing engagement with the center wall inner surface 3. The opposite ends of the rotary piston are substantially flat faces having side seal stripes 8 extending between pairs of apex seals 7, and the side seal stripes 8 sealingly engage with the end walls 1 thereby forming, together with the apex seals 7, a plurality of working chambers 9 which vary in volume when the rotary piston 7 rotates within and relative to the housing. An intake port 10 is provided in the center wall 2 for admitting gas mixture. An ignition means (not shown) open extent is abruptly performed and the high-fre- may be provided for igniting the mixture and an exhaust port 11 circumferentially spaced from the intake port 10 is provided in the side wall 1 for exhausting the combustion product so that the strokes of intake, compression, power, expansion and exhaust may be carried out. Radially inwardly spaced from the side seal stripes 8 is an oil seal ring 12 and provided adjacent each apex of the piston 6 are corner seals 13 adapted for combining each end of the side seal strips 8 together with an axial end of the apex seal 7 for sealing engagement with the adjacent end wall inner face. Though FIGS. 1–3 show the exhaust port provided in the end wall for the expelling the combustion products, the exhaust port may be positioned in the center casing 2 as shown in FIGS. 4–9 with reference number 14.

Provided at the initial opening edge of the exhaust port 11 is a recess 15 which opens to the working chamber 9 and extends towards the counter rotational direction of the piston 6. In the modification embodiment shown in FIGS. 4–6, a recess 16 likewise positions at the initial opening edge of the exhaust port 14 and similarly opens to the working chamber and extends towards the counter rotational direction of the rotary piston 6. The hereinabove described recesses 15 and 16 each forming a part of the exhaust port 11 or 14 and opening or extending immediately from the exhaust port 11 or 16.

The rotary piston 6 rotates in the direction as shown with arrow in each drawing and the strokes of intake, compression, power, expansion and exhaust are thereby performed. When the expansion stroke comes to final and the side seal 8, in case of the embodiment shown in FIGS. 1–3, comes to over the recess 15, the expelling of the combustion products starts gently through the recess 15 and thereby the exhausting products are partially expelled before the substantial exhaust takes place. This means that the exhaust pressure is gradually lowered before the substantial exhaust takes place and thereby the flowing resistance in the exhaust port 11 during the substantial exhaust is lowered and the abrupt change of the pressure in the exhaust port, which causes the high-frequency explosive noise, is thereby eliminated.

Figure 4:
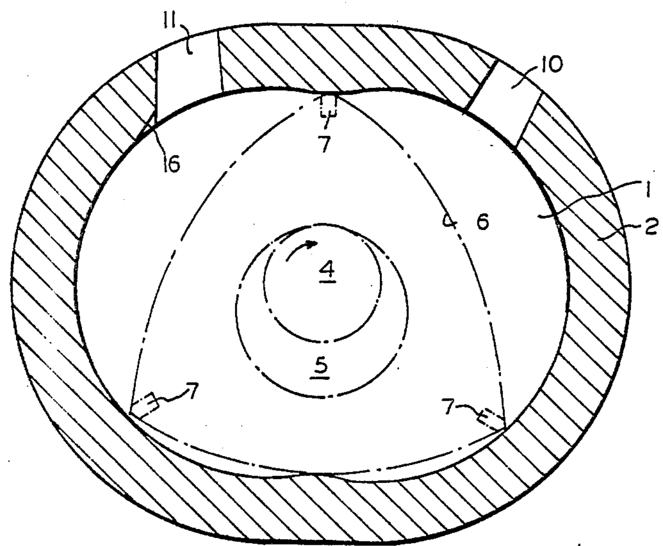
FIG. 4 is a diagramatic view similar to FIG. 1 showing a modification of the invention.
Figure 5:
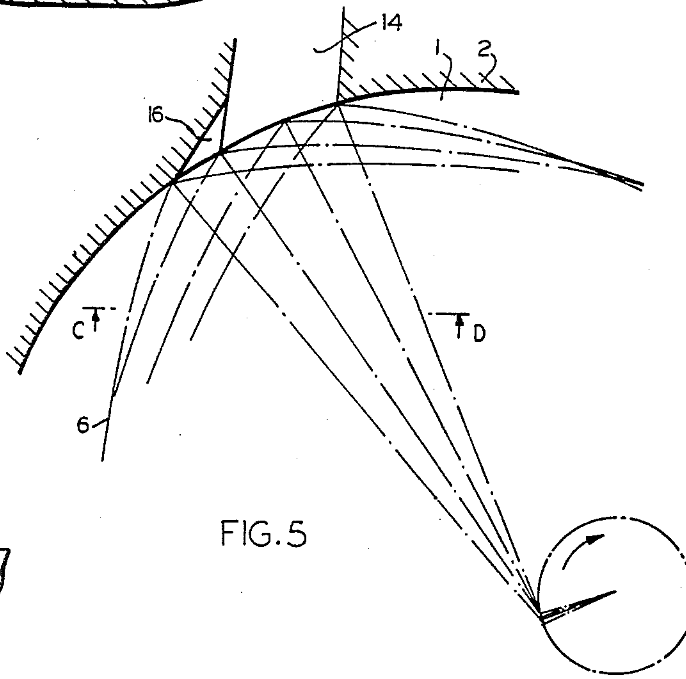
FIG. 5 is an enlarged fragmentary view showing the exhaust port in detail.
Figure 6:
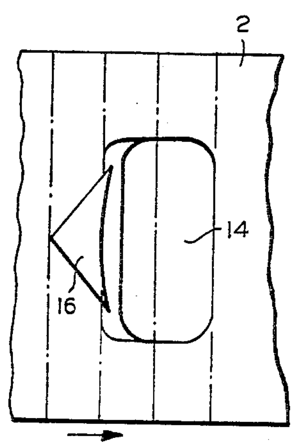
FIG. 6 is a cross sectional view taken along the line C—D of FIG. 5.

When the embodiment is as shown in FIGS. 4–6, the gradual expelling of the exhaust products before the substantial exhausting is performed by passing over of the apex seal 9 over the recess 16 in the center casing 2, and the substantial exhaust thereafter is performed through the exhaust port 14 with the apex seal passing thereover.

Figure 7:
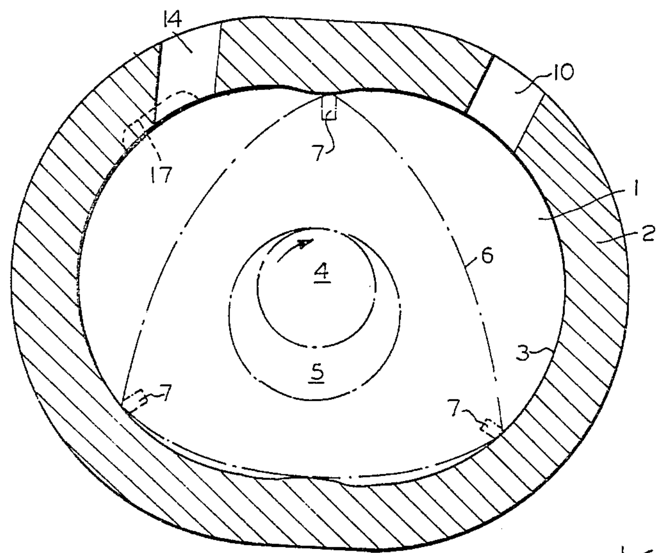
FIG. 7 is another diagramatic view similar to FIG. 4 but showing a further modification of the invention.
Figure 8:
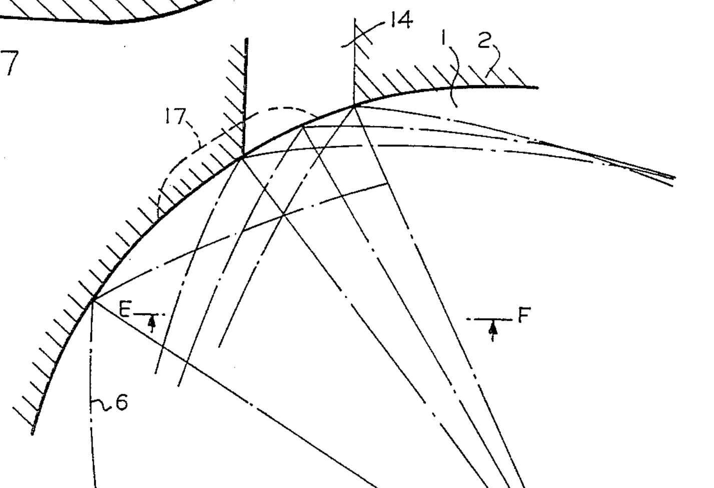
FIG. 8 is an enlarged fragmentary view showing the enlarged exhaust port according to the present invention.
Figure 9:
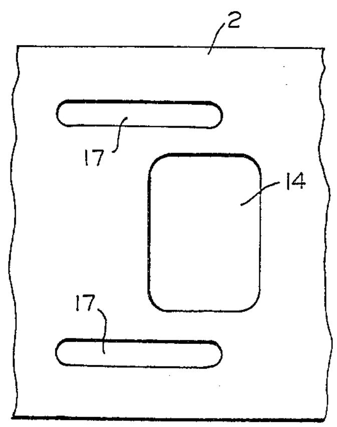
FIG. 9 is a cross sectional view taken along the line E—E of FIG. 8.

FIGS. 7–9 show a further modification in which recesses are provided adjacent the exhaust port 14 but separated therefrom. Wherein the gradual expelling of the exhaust products before the substantial exhaust is similarly performed by passing the apex seal 7 over the said recesses 17.

We claim:

1. A rotary piston internal combustion engine comprising a housing composed of a pair of end walls and a center wall interconnecting the end walls, said walls forming a cavity therebetween, a shaft rotatably mounted in the end walls; an eccentric portion on the said shaft and positioned in the cavity, a rotary piston rotatably mounted on the said eccentric portion in the said cavity and the said piston having at least three circumferentially spaced apexes dividing said cavity into a plurality of working chambers, an apex seal on each apex of the piston in sealing engagement with the inner surface of the center wall, a side seal strip extending along the face on each end of the piston between each pair of the apex seals in sealing engagement with the inner faces of the adjacent end walls, said housing having at least one exhaust port therein, and at least one recess in the inner face of the housing for permitting gentle expelling of the combustion products therethrough to the said exhaust port before the substantial exhausting through the exhaust port takes place.

2. A rotary piston internal combustion engine comprising a housing composed of a pair of end walls and a center wall interconnecting the end walls, said walls forming a cavity therebetween, a shaft rotatably mounted in the end walls, an eccentric portion on the said shaft and positioned in the cavity, a rotary piston rotatably mounted on the said eccentric portion in the said cavity and the said piston having at least three circumferentially spaced apexes dividing said cavity into a plurality of working chambers, an apex seal on each apex of the piston in sealing engagement with the inner surface of the center wall, a side seal strip extending along the face on each end of the piston between each pair of the apex seals in sealing engagement with the inner faces of the adjacent end walls, said housing having at least one exhaust port therein, and at least one recess in the inner face of the housing at the edge of said exhaust port which is first uncovered by the apexes of said piston, said recess extending in a direction opposite the direction of rotation of the piston for permitting gentle expelling of the combustion products therethrough to the said exhaust port before the substantial exhausting through the exhaust ports takes place.

3. A rotary piston internal combustion engine as claimed in claim 2 in which said exhaust port is provided in said center wall and said at least one recess is in the inner face of said center wall.

4. A rotary piston internal combustion engine as claimed in claim 2 in which said exhaust port is provided in one of said end walls, and said at least one recess is provided in the inner face of said end wall.

5. A rotary piston internal combustion engine comprising a housing composed of a pair of end walls and a center wall interconnecting the end walls, said walls forming a cavity therebetween, a shaft rotatably mounted in the end walls, an eccentric portion on the said shaft and positioned in the cavity, a rotary piston rotatably mounted on the said eccentric portion in the said cavity and the said piston having at least three circumferentially spaced apexes dividing said cavity into a plurality of working chambers, an apex seal on each apex of the piston in sealing engagement with the inner surface of the center wall, a side seal strip extending along the face on each end of the piston between each pair of the apex seals in sealing engagement with the inner faces of the adjacent end walls, said housing having at least one exhaust port therein, and at least one recess in the inner face of the housing adjacent and separate from the said exhaust port and extending past the initially uncovered edge of the exhaust port for permitting gentle expelling of the combustion products therethrough and then through said cavity to the said exhaust port just after the edge of the exhaust port is uncovered and before substantial exhausting through the exhaust port takes place.

6. A rotary piston internal combustion engine as claimed in claim 5 in which said exhaust port is in said center wall and said at least one recess is in the inner face of said center wall.

7. A rotary piston internal combustion engine as claimed in claim 6 in which said exhaust port is in the center wall of said housing and in which two recesses are provided, one on each side of said exhaust port laterally spaced therefrom with respect to the direction of rotation of the rotary piston.

References Cited

UNITED STATES PATENTS

| | | | |
|---|---|---|---|
| 3,075,505 | 1/1963 | Froede | 123—8 |
| 3,103,208 | 9/1963 | Price | 123—8 |
| 3,204,564 | 9/1965 | Eltze | 103—126 |
| 3,259,114 | 7/1966 | Gassmann | 123—8 |

MARK NEWMAN, Primary Examiner

D. HART, Assistant Examiner

U.S. Cl. X.R.

91—56